United States Patent
DiLorenzo et al.

(10) Patent No.: US 12,189,213 B2
(45) Date of Patent: Jan. 7, 2025

(54) EYEWEAR WITH OFFSET TEMPLE AND NOSE GRIPS

(71) Applicant: TYR Sport, Inc., Farmingdale, NY (US)

(72) Inventors: Matthew Vito DiLorenzo, New York, NY (US); Stephanie Lawrence, Farmingdale, NY (US)

(73) Assignee: TYR Sport, Inc., Farmingdale, NY (US)

( * ) Notice: Subject to any disclaimer, the term of this patent is extended or adjusted under 35 U.S.C. 154(b) by 495 days.

(21) Appl. No.: 17/373,506

(22) Filed: Jul. 12, 2021

(65) Prior Publication Data
US 2023/0010727 A1    Jan. 12, 2023

(51) Int. Cl.
*G02C 5/14*    (2006.01)
*G02C 5/12*    (2006.01)

(52) U.S. Cl.
CPC ............. *G02C 5/143* (2013.01); *G02C 5/12* (2013.01)

(58) Field of Classification Search
CPC ...... G02C 5/143; G02C 5/12; G02C 2200/20; G02C 5/126; G02C 5/00; G02C 5/14; G02C 11/00; G02C 5/02; G02C 5/146; G02C 3/006
See application file for complete search history.

(56) References Cited

U.S. PATENT DOCUMENTS

| | | | |
|---|---|---|---|
| 5,196,871 A | 3/1993 | Tom | |
| 5,583,583 A * | 12/1996 | Wilson | G02C 5/146 351/122 |
| 7,347,545 B1 | 3/2008 | Jannard et al. | |
| D581,443 S | 11/2008 | Jannard et al. | |
| D581,444 S | 11/2008 | Jannard et al. | |
| D581,447 S | 11/2008 | Yee | |
| D581,449 S | 11/2008 | Yee | |
| D581,450 S | 11/2008 | Moritz | |
| D581,451 S | 11/2008 | Yee | |

(Continued)

FOREIGN PATENT DOCUMENTS

EP    2426546 A1 *    3/2012    ............. G02C 3/006

OTHER PUBLICATIONS

US D725,178 S, 03/2015, Shin (withdrawn)
(Continued)

*Primary Examiner* — Joseph P Martinez
*Assistant Examiner* — Ray Alexander Dean
(74) *Attorney, Agent, or Firm* — Stetina Brunda Garred & Brucker (57) ABSTRACT

Eyewear includes a frame, a pair of nose pads, and a pair of temples. Each of the nose pads may have a surface that faces a respective side of the wearer's nose. The eyewear may include a pair of nose grips disposed respectively on the nose pads, each of the nose grips defining a plurality of nose grip surfaces that face the respective side of the wearer's nose and are offset toward the wearer's nose from the surface of the respective nose pad. Each of the temples may have a surface that faces a respective side of the wearer's head. The eyewear may include a pair of temple grips disposed respectively on the temples, each of the temple grips defining a plurality of temple grip surfaces that face the respective side of the wearer's head and are offset toward the wearer's head from the surface of the respective temple.

19 Claims, 3 Drawing Sheets

(56) References Cited

U.S. PATENT DOCUMENTS

| | | |
|---|---|---|
| D582,957 S | 12/2008 | Moritz |
| D583,404 S | 12/2008 | Baden et al. |
| D584,335 S | 1/2009 | Baden et al. |
| D586,378 S | 2/2009 | Yee |
| D586,379 S | 2/2009 | Thixton et al. |
| D586,380 S | 2/2009 | Yee |
| D586,381 S | 2/2009 | Yee |
| D588,627 S | 3/2009 | Yee et al. |
| D590,432 S | 4/2009 | Yee |
| D591,787 S | 5/2009 | Yee |
| D594,501 S | 6/2009 | Yee |
| D595,757 S | 7/2009 | Yang |
| D599,835 S | 9/2009 | Yee |
| D599,836 S | 9/2009 | Rohrbach |
| D599,838 S | 9/2009 | Rohrbach |
| D599,839 S | 9/2009 | Rohrbach |
| 7,594,723 B2 | 9/2009 | Jannard et al. |
| D601,613 S | 10/2009 | Yee |
| D604,756 S | 11/2009 | Shin et al. |
| D604,757 S | 11/2009 | Yee |
| D604,758 S | 11/2009 | Rohrbach et al. |
| D604,759 S | 11/2009 | Rohrbach et al. |
| D607,039 S | 12/2009 | Yee |
| D607,040 S | 12/2009 | Rohrbach |
| D609,736 S | 2/2010 | Wang |
| D609,737 S | 2/2010 | Jannard et al. |
| D610,603 S | 2/2010 | Thixton |
| D610,604 S | 2/2010 | Thixton |
| D611,980 S | 3/2010 | Chen |
| D612,412 S | 3/2010 | Yee |
| D612,413 S | 3/2010 | Thixton |
| D613,329 S | 4/2010 | Jannard et al. |
| D614,359 S | 4/2010 | Gleason et al. |
| D614,685 S | 4/2010 | Moritz |
| D615,580 S | 5/2010 | Baden et al. |
| D615,581 S | 5/2010 | Yee |
| D616,012 S | 5/2010 | Yee |
| D616,919 S | 6/2010 | Thixton |
| D616,920 S | 6/2010 | Thixton |
| D617,364 S | 6/2010 | Chou |
| D620,970 S | 8/2010 | Thixton |
| D622,302 S | 8/2010 | Yee |
| D622,303 S | 8/2010 | Thixton |
| D622,304 S | 8/2010 | Baden et al. |
| D622,755 S | 8/2010 | Yee |
| D623,218 S | 9/2010 | Wong et al. |
| D623,683 S | 9/2010 | Rohrbach |
| D623,684 S | 9/2010 | Yee |
| D624,579 S | 9/2010 | Rohrbach |
| D629,036 S | 12/2010 | Yee et al. |
| D636,010 S | 4/2011 | Moritz |
| D640,314 S | 6/2011 | Yang |
| D640,725 S | 6/2011 | Moritz et al. |
| D640,726 S | 6/2011 | Leight |
| D640,727 S | 6/2011 | Moritz et al. |
| D646,708 S | 10/2011 | Moritz et al. |
| D648,771 S | 11/2011 | Rohrbach |
| D648,772 S | 11/2011 | Shin et al. |
| D648,773 S | 11/2011 | Thixton |
| D649,579 S | 11/2011 | Thixton |
| D650,825 S | 12/2011 | Yee et al. |
| D651,641 S | 1/2012 | Fulton |
| D651,642 S | 1/2012 | Fuchs |
| D652,442 S | 1/2012 | Yee et al. |
| D653,697 S | 2/2012 | Taylor et al. |
| D653,698 S | 2/2012 | Taylor et al. |
| D653,699 S | 2/2012 | Shin |
| D654,947 S | 2/2012 | Shin et al. |
| D655,741 S | 3/2012 | Yee |
| D659,179 S | 5/2012 | Thixton |
| D659,180 S | 5/2012 | Moritz |
| D659,181 S | 5/2012 | Moritz |
| D659,182 S | 5/2012 | Shin et al. |
| D661,339 S | 6/2012 | Thixton et al. |
| D662,124 S | 6/2012 | Shin |
| D662,125 S | 6/2012 | Yee |
| D662,536 S | 6/2012 | Shin |
| D662,967 S | 7/2012 | Shin |
| D664,590 S | 7/2012 | Shin |
| D673,997 S | 1/2013 | Rohrbach |
| D674,434 S | 1/2013 | Rohrbach |
| D675,664 S | 2/2013 | Moritz |
| D675,666 S | 2/2013 | Thixton et al. |
| D675,667 S | 2/2013 | Shin |
| D676,479 S | 2/2013 | Yoo |
| D676,480 S | 2/2013 | Shin |
| D676,898 S | 2/2013 | Shin et al. |
| D678,389 S | 3/2013 | Rohrbach |
| D678,934 S | 3/2013 | Yee |
| D679,313 S | 4/2013 | Bachelder |
| D685,897 S | 7/2013 | Drew |
| D687,481 S | 8/2013 | Moritz |
| D690,762 S | 10/2013 | Yang |
| D692,047 S | 10/2013 | Shin |
| D695,336 S | 12/2013 | Wang Lee |
| D700,932 S | 3/2014 | Yee et al. |
| D700,933 S | 3/2014 | Shin |
| 8,661,562 B2 | 3/2014 | Calilung et al. |
| D702,757 S | 4/2014 | Thixton et al. |
| D703,260 S | 4/2014 | Yoo |
| D703,733 S | 4/2014 | Thixton et al. |
| D705,339 S | 5/2014 | Yoo |
| D705,340 S | 5/2014 | Shin |
| D707,284 S | 6/2014 | Yoo |
| D710,435 S | 8/2014 | Thixton et al. |
| D711,958 S | 8/2014 | Yoo |
| D711,962 S | 8/2014 | Thixton |
| D714,858 S | 10/2014 | Thixton |
| D717,363 S | 11/2014 | Moritz |
| D719,209 S | 12/2014 | Garfias |
| D720,799 S | 1/2015 | Thixton |
| D720,800 S | 1/2015 | Shin |
| D721,128 S | 1/2015 | Yoo |
| D724,135 S | 3/2015 | Shin |
| D724,648 S | 3/2015 | Yoo |
| D724,649 S | 3/2015 | Shin |
| D725,690 S | 3/2015 | Garfias |
| D725,695 S | 3/2015 | Garfias |
| D725,696 S | 3/2015 | Garfias |
| D737,364 S | 3/2015 | Shin |
| D727,407 S | 4/2015 | Yoo |
| D728,002 S | 4/2015 | Uhm |
| D728,004 S | 4/2015 | Yee |
| D728,005 S | 4/2015 | Yee |
| D728,006 S | 4/2015 | Yee |
| D728,007 S | 4/2015 | Uhm |
| D728,008 S | 4/2015 | Thixton |
| D728,664 S | 5/2015 | Yoo |
| D729,304 S | 5/2015 | Yee |
| D729,305 S | 5/2015 | Garfias |
| D729,866 S | 5/2015 | Yoo |
| D730,431 S | 5/2015 | Yoo |
| D730,434 S | 5/2015 | Chen |
| D731,581 S | 6/2015 | Yee |
| D735,788 S | 8/2015 | Uhm |
| D735,794 S | 8/2015 | Markovitz et al. |
| D737,889 S | 9/2015 | Yoo |
| D739,457 S | 9/2015 | Moritz |
| D740,346 S | 10/2015 | Yoo |
| D740,347 S | 10/2015 | Corcoran |
| D740,348 S | 10/2015 | Yoo |
| D740,880 S | 10/2015 | Thixton |
| D744,565 S | 12/2015 | Thixton et al. |
| D745,083 S | 12/2015 | Yoo et al. |
| D745,921 S | 12/2015 | Thixton et al. |
| D746,355 S | 12/2015 | Uhm |
| D746,365 S | 12/2015 | Thixton |
| D746,367 S | 12/2015 | Shin |
| D746,368 S | 12/2015 | Uhm |
| D746,369 S | 12/2015 | Uhm |
| D747,402 S | 1/2016 | Shin |
| D747,762 S | 1/2016 | Yoo |
| D748,175 S | 1/2016 | Yoo |
| D748,188 S | 1/2016 | Shin |

(56) References Cited

U.S. PATENT DOCUMENTS

| | | |
|---|---|---|
| D748,190 S | 1/2016 | Shin |
| D749,670 S | 2/2016 | Shin |
| D752,669 S | 3/2016 | Garfias |
| D752,678 S | 3/2016 | Thixton |
| D753,758 S | 4/2016 | Uhm |
| D754,244 S | 4/2016 | Shin |
| D756,446 S | 5/2016 | Yoo |
| D757,156 S | 5/2016 | Wu |
| D759,151 S | 6/2016 | Yoo |
| D761,898 S | 7/2016 | Yoo |
| D763,828 S | 8/2016 | Yoo |
| D763,944 S | 8/2016 | Shin |
| D763,945 S | 8/2016 | Thixton |
| D763,946 S | 8/2016 | Chae |
| D763,947 S | 8/2016 | Shin |
| D763,949 S | 8/2016 | Shin |
| D763,950 S | 8/2016 | Thixton |
| D763,951 S | 8/2016 | Chae |
| D764,568 S | 8/2016 | Yoo |
| D765,765 S | 9/2016 | Clegg |
| D767,008 S | 9/2016 | Thixton |
| D768,747 S | 10/2016 | Garfias |
| D768,748 S | 10/2016 | Yoo |
| D769,963 S | 10/2016 | Shin |
| D770,559 S | 11/2016 | Shin |
| D770,560 S | 11/2016 | Shin |
| D771,739 S | 11/2016 | Shin |
| D774,590 S | 12/2016 | Thixton |
| D777,827 S | 1/2017 | Chen |
| D778,339 S | 2/2017 | Yoo |
| D778,340 S | 2/2017 | Garfias |
| D778,341 S | 2/2017 | Chae |
| D779,583 S | 2/2017 | Garfias |
| D783,071 S | 4/2017 | Garfias |
| D783,080 S | 4/2017 | Garfias |
| D783,081 S | 4/2017 | Uhm |
| D783,083 S | 4/2017 | Shin |
| D783,698 S | 4/2017 | Garfias |
| D783,707 S | 4/2017 | Uhm |
| D783,708 S | 4/2017 | Chae |
| D785,079 S | 4/2017 | Uhm |
| D785,700 S | 5/2017 | Thixton |
| D789,440 S | 6/2017 | Uhm |
| D795,330 S | 8/2017 | Thixton |
| D797,180 S | 9/2017 | Uhm |
| D797,182 S | 9/2017 | Garfias |
| D797,183 S | 9/2017 | Flake et al. |
| D798,371 S | 9/2017 | Thixton et al. |
| D798,374 S | 9/2017 | Shin |
| D798,375 S | 9/2017 | Flake et al. |
| D798,945 S | 10/2017 | Thixton |
| D798,946 S | 10/2017 | Shin |
| D799,585 S | 10/2017 | Thixton |
| D799,586 S | 10/2017 | Thixton |
| D799,587 S | 10/2017 | Thixton |
| D800,828 S | 10/2017 | Shin |
| D801,425 S | 10/2017 | Uhm |
| D802,047 S | 11/2017 | Chae |
| D802,651 S | 11/2017 | Thixton |
| D809,042 S | 1/2018 | Thixton |
| D809,056 S | 1/2018 | Flake et al. |
| D810,183 S | 2/2018 | Garfias |
| D810,815 S | 2/2018 | Yoo |
| D815,186 S | 4/2018 | Shin |
| D818,519 S | 5/2018 | Thixton |
| D818,522 S | 5/2018 | Garfias |
| D820,347 S | 6/2018 | Chae |
| D821,486 S | 6/2018 | Garfias |
| D821,487 S | 6/2018 | Thixton |
| D823,374 S | 7/2018 | Shin et al. |
| D823,929 S | 7/2018 | Chae |
| D823,930 S | 7/2018 | Garfias |
| D823,931 S | 7/2018 | Shin |
| D823,932 S | 7/2018 | Garfias |
| D827,017 S | 8/2018 | Thixton |
| D827,690 S | 9/2018 | Shin |
| D828,437 S | 9/2018 | Thixton |
| D829,271 S | 9/2018 | Thixton |
| D831,733 S | 10/2018 | Kim |
| D831,734 S | 10/2018 | Thixton |
| D837,871 S | 1/2019 | Canales et al. |
| D841,080 S | 2/2019 | Thixton |
| D841,081 S | 2/2019 | Thixton |
| D841,083 S | 2/2019 | Shin |
| D841,084 S | 2/2019 | Kim |
| D842,355 S | 3/2019 | Chae |
| D842,363 S | 3/2019 | Chae |
| D842,364 S | 3/2019 | Chae |
| D842,365 S | 3/2019 | Chae |
| D842,368 S | 3/2019 | Thixton |
| D842,370 S | 3/2019 | Thixton |
| D842,371 S | 3/2019 | Shin |
| D842,922 S | 3/2019 | Shin |
| D843,436 S | 3/2019 | Shin |
| D846,018 S | 4/2019 | Shin |
| D847,251 S | 4/2019 | Kim |
| D847,897 S | 5/2019 | Kim |
| D849,823 S | 5/2019 | Canales et al. |
| D849,825 S | 5/2019 | Canales et al. |
| D850,521 S | 6/2019 | Shin |
| D850,522 S | 6/2019 | Thixton |
| D855,686 S | 8/2019 | Shin |
| 10,394,049 B2 | 8/2019 | Canales et al. |
| D859,512 S | 9/2019 | Kim |
| D860,303 S | 9/2019 | Shin |
| D866,649 S | 11/2019 | Lee |
| D866,650 S | 11/2019 | Lee |
| D870,171 S | 12/2019 | Chae |
| D870,802 S | 12/2019 | Canales et al. |
| D871,497 S | 12/2019 | Canales et al. |
| 10,527,868 B2 | 1/2020 | Canales et al. |
| D875,816 S | 2/2020 | Kim |
| D875,818 S | 2/2020 | Kim |
| 10,558,059 B1 * | 2/2020 | Sanchez .................. G02C 5/12 |
| D878,774 S | 3/2020 | Lee |
| D879,187 S | 3/2020 | Thixton |
| D879,188 S | 3/2020 | Thixton |
| D879,189 S | 3/2020 | Lee |
| D879,190 S | 3/2020 | Thixton |
| D879,191 S | 3/2020 | Thixton |
| D880,575 S | 4/2020 | Thixton |
| D884,062 S | 5/2020 | Thixton |
| D884,063 S | 5/2020 | Thixton |
| D884,064 S | 5/2020 | Thixton |
| D884,065 S | 5/2020 | Thixton |
| D884,067 S | 5/2020 | Thixton |
| D889,531 S | 7/2020 | Canales et al. |
| D892,202 S | 8/2020 | Thixton |
| D894,259 S | 8/2020 | Le et al. |
| D894,260 S | 8/2020 | Lee et al. |
| D895,718 S | 9/2020 | Meunier et al. |
| D898,793 S | 10/2020 | Thixton |
| D899,504 S | 10/2020 | Thixton |
| D899,505 S | 10/2020 | Thixton |
| D899,508 S | 10/2020 | Lee |
| D900,208 S | 10/2020 | Thixton |
| D904,503 S | 12/2020 | Lee et al. |
| 2002/0126253 A1 * | 9/2002 | Wu ........................ G02C 5/16 351/123 |
| 2008/0260994 A1 * | 10/2008 | Nakanishi .............. G02C 5/143 428/140 |
| 2017/0160562 A1 * | 6/2017 | McCabe ................ G02C 3/003 |
| 2019/0107732 A1 | 4/2019 | Canales et al. |
| 2019/0346689 A1 | 11/2019 | Canales et al. |

OTHER PUBLICATIONS

Patent Cooperation Treaty, International Search Report and Written Opinion for International Application No. PCT/US 22/33278, mailed Sep. 8, 2022, 8 pages.
Tyr Men's Apollo Hts Sunglasses Rectangular. Tyr [online]. Date First Available Oct. 22, 2021 (Oct. 22, 2021), Retrieved from the Internet: <https://www.amazon.com/TYR-Apollo-Sunglasses-Polarized- (56) References Cited

OTHER PUBLICATIONS

Rectangular/dp/B09K2SL3RF?ref_=ast_sto_dp&th=1&psc=1>, entire document.

* cited by examiner

EYEWEAR WITH OFFSET TEMPLE AND NOSE GRIPS

CROSS-REFERENCE TO RELATED APPLICATIONS

Not Applicable

STATEMENT RE: FEDERALLY SPONSORED RESEARCH/DEVELOPMENT

Not Applicable

BACKGROUND

During any kind of athletic activity, eyewear such as sunglasses or prescription glasses has a tendency to slip off the wearer's face due to the vigorous movements of the wearer. One common approach to solving this problem is to connect the temples together behind the wearer's head with a strap that rests loosely on the wearer's neck. However, this only prevents the glasses from falling to the ground (where they might break). It does not prevent the constant slippage that requires the wearer to readjust the eyewear or to put the eyewear back on once it has fallen off and is dangling from the wearer's neck. Other approaches include the use of rubber or other grippy material for the glasses or as sleeves that fit over the temples. While they may be helpful for reducing slippage, these approaches either entail an expensive departure from conventional eyewear materials or, in the case of sleeves, require the inconvenience of purchasing accessories that fit and match the wearer's glasses.

BRIEF SUMMARY

The present disclosure contemplates various devices and methods for overcoming the above drawbacks associated with the related art. One aspect of the embodiments of the present disclosure is eyewear comprising a frame, a pair of nose pads, and a pair of temples. Each of the nose pads may have a surface that faces a respective side of the wearer's nose, and the eyewear may comprise a pair of nose grips disposed respectively on the pair of nose pads, each of the nose grips defining a plurality of nose grip surfaces that face the respective side of the wearer's nose and are offset toward the wearer's nose from the surface of the respective nose pad. Each of the temples may have a surface that faces a respective side of the wearer's head, and the eyewear may comprise a pair of temple grips disposed respectively on the pair of temples, each of the temple grips defining a plurality of temple grip surfaces that face the respective side of the wearer's head and are offset toward the wearer's head from the surface of the respective temple.

Each of the nose grips may be disposed within a recess defined in the surface of the respective nose pad.

Each of the nose grips may be formed integrally with the respective nose pad.

Each of the nose grips may be made of a more flexible material than the respective nose pad.

At least some of the plurality of nose grip surfaces of each of the nose grips may be arranged in stripes. The stripes may extend orthogonal to a direction of gravity when the eyewear is worn.

Each of the temple grips may be disposed within a recess defined in the surface of the respective temple.

Each of the temple grips may be formed integrally with the respective temple.

Each of the temple grips may be made of a more flexible material than the respective temple.

At least some of the plurality of temple grip surfaces of each of the temple grips may be arranged in stripes. At least some of the plurality of temple grip surfaces of each of the temple grips may be V-shaped.

The plurality of temple grip surfaces of each of the temple grips may comprise twenty or more temple grip surfaces. The plurality of temple grip surfaces of each of the temple grips may comprise thirty or more temple grip surfaces.

Each of the temples may have a temple tip, and each of the temple grips may extend along a length of the respective temple beginning at the temple tip. Each of the temple grips may extend more than halfway along the length of the respective temple.

Each of the temple grips may have a periphery that matches a contour of the surface of the respective temple. Each of the temples may have a temple tip that is wider than a portion of the temple closer to the frame, and the periphery of each of the temple grips may match the contour of the surface of the respective temple at the temple tip.

The eyewear may be sunglasses.

Another aspect of the embodiments of the present disclosure is eyewear comprising a frame and a pair of temples, each of the temples having a surface that faces a respective side of the wearer's head. The eyewear may comprise a pair of temple grips disposed respectively on the pair of temples, each of the temple grips defining a plurality of temple grip surfaces that face the respective side of the wearer's head and are offset toward the wearer's head from the surface of the respective temple.

Another aspect of the embodiments of the present disclosure is eyewear comprising a frame and a pair of nose pads, each of the nose pads having a surface that faces a respective side of the wearer's nose. The eyewear may comprise a pair of nose grips disposed respectively on the pair of nose pads, each of the nose grips defining a plurality of nose grip surfaces that face the respective side of the wearer's nose and are offset toward the wearer's nose from the surface of the respective nose pad.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The present disclosure encompasses various embodiments of eyewear having nose grips and/or temple grips for preventing slippage so that the eyewear stays in place on the wearer's face. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
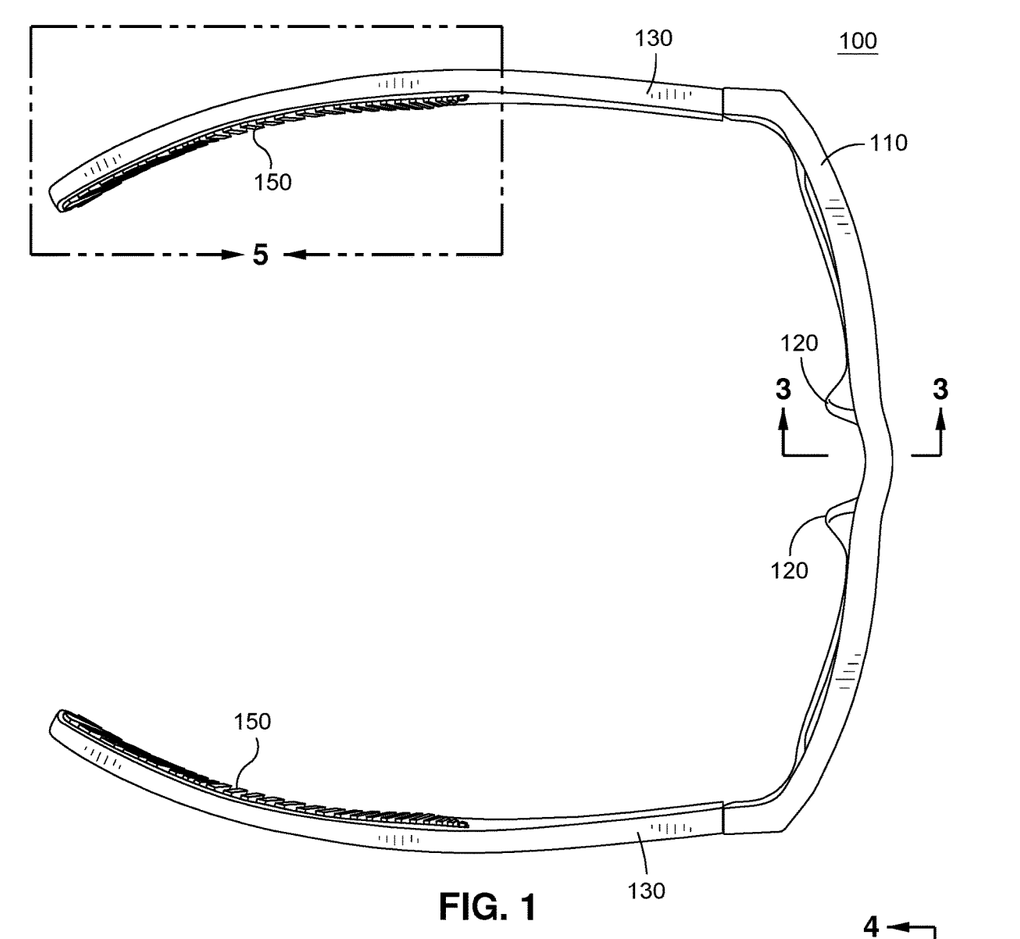
FIG. 1 is a top view of eyewear according to an embodiment of the present disclosure.
Figure 2:
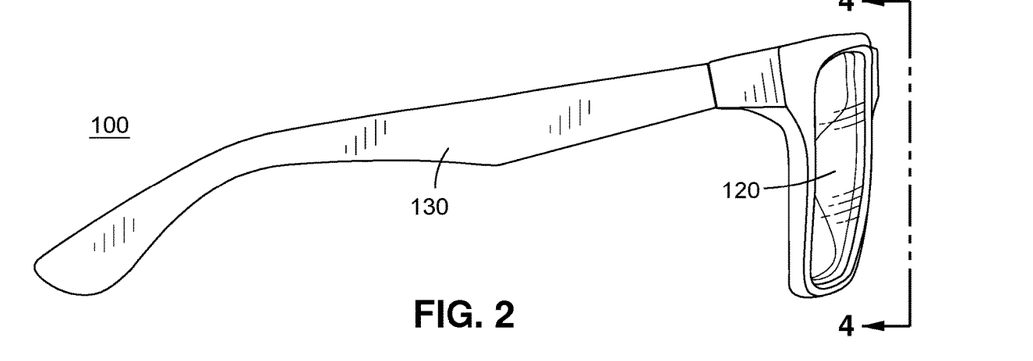
FIG. 2 is a sideview thereof.

FIG. 1 is a top view of eyewear 100 according to an embodiment of the present disclosure, and FIG. 2 is a sideview thereof. The eyewear 100 may have a frame 110 that positions the lenses in front of the wearer's eyes and a pair of nose pads 120 that sit on the nose of the wearer to support the eyewear 100 on the wearer's face. The nose pads 120 may be formed integrally with the frame 110 as shown or may be separate pieces that connect to the frame 110 (e.g. via pad arms). The eyewear 100 may further have a pair of temples 130 that are connected to the frame 110 by hinges, for example, and extend orthogonally from the frame 110 along the sides of the wearer's head, eventually coming to rest on the wearer's ears to further support the eyewear 100 on the wearer's face. Unlike conventional eyewear, the disclosed eyewear 100 may include slip-preventing grips at one or both of these support sites, namely at the nose pads 120 and/or the temples 130. As a result, the wearer can freely engage in athletic activity without worrying about slippage and without needing to install any accessories, while at the same time the eyewear 100 may be inexpensively made, primarily using conventional materials such as nylon or other plastics.

Figure 3:
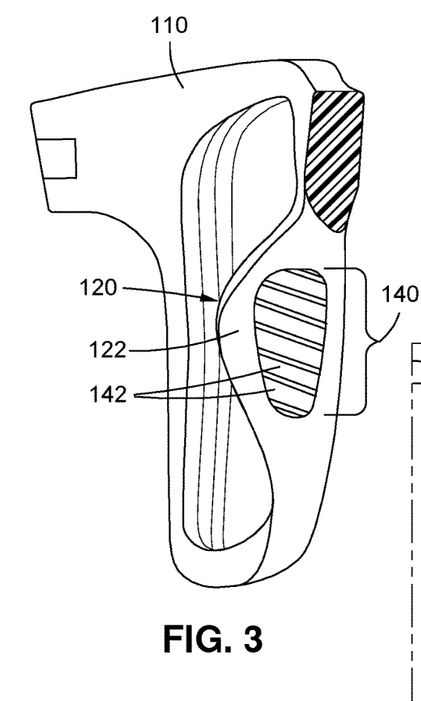
FIG. 3 is a cross-sectional view taken along the line 3-3 in FIG. 1.
Figure 4:
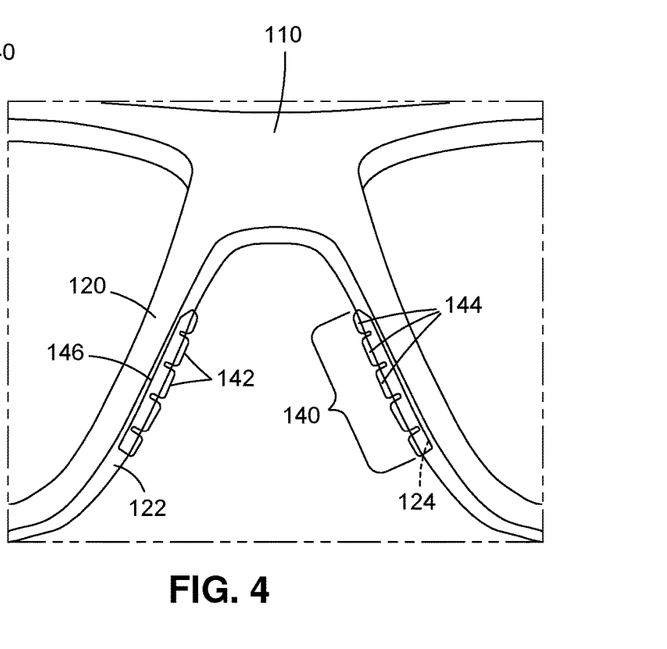
FIG. 4 is a partial front view taken along the line 4-4 in FIG. 2.

Referring first to FIGS. 3 and 4, the eyewear 100 may include a pair of nose grips 140 disposed respectively on the pair of nose pads 120. Each of the nose pads 120 may have a surface 122 that faces a respective side of the wearer's nose, with the respective nose grip 140 being disposed on the nose pad 120 so as to face that same side of the wearer's nose. More particularly, as best seen in FIG. 4, each of the nose grips 140 may define a plurality of nose grip surfaces 142 that face the respective side of the wearer's nose and are offset toward the wearer's nose from the surface 122 of the respective nose pad 120. The nose grip surfaces 142 may be arranged in a pattern that promotes grip. For example, some or all of the nose grip surfaces 142 of each nose grip 140 may be arranged in stripes as shown. Advantageously, the stripes may extend orthogonal to the direction of gravity when the eyewear 100 is worn. In this way, the direction of most likely slippage, namely the direction of gravity as the eyewear 100 begins to slip down off the nose, corresponds to the relative movement of the nose against the grain of the stripes, which is the movement that is most hindered by the nose grip surfaces 142.

The nose grips 140 may be made of a more flexible material than the respective nose pads 120. For example, the nose pads 120 may be made of a hard plastic such as nylon, while the nose grips 140 may be made of an elastomer such as a natural or synthetic rubber. The two materials may be bonded together by a co-molding process or may be produced separately and subsequently bonded by an adhesive. As shown in FIG. 4, each of the nose grips 140 may be disposed within a recess 124 defined in the surface 122 of the respective nose pad 120. In this regard, the nose grip surfaces 142 of each nose grip 140 may be surfaces defined by a plurality of spaced apart protuberances 144 protruding from a common base 146 that fits into the recess 124 and is bonded to the nose pad 120 therein. In this case, the nose grip surfaces 142 may be offset from the surface 122 of the respective nose pad 120 by a distance equal to the height of the nose grip 140 (including the protuberances 144 and the base 146) minus the depth of the recess 124. Alternatively, the nose grips 140 may be formed integrally with the respective nose pads 120, in which case the nose grips 140 and corresponding nose pads 120 may be made of the same material and by the same molding process, for example.

Figure 5:
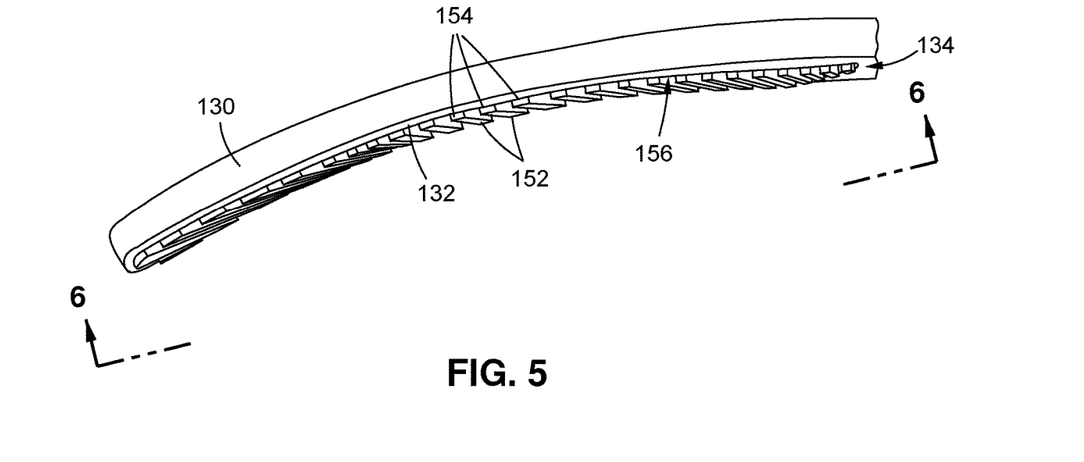
FIG. 5 is a close-up view taken along the line 5-5 in FIG. 1.

Referring back to FIG. 1 and, in more detail, FIG. 5, the eyewear 100 may alternatively or additionally include a pair of temple grips 150 disposed respectively on the pair of temples 130. Each of the temples 130 may have a surface 132 that faces a respective side of the wearer's head, with the respective temple grip 150 being disposed on the temple 130 so as to face that same side of the wearer's head. Each of the temple grips 150 may define a plurality of temple grip surfaces 152 that face the respective side of the wearer's head and are offset toward the wearer's head from the surface 132 of the respective temple 130. Like the nose grip surfaces 142, the temple grip surfaces 152 may be made of a more flexible material than the respective temples 130. For example, the temples 130 may be made of a hard plastic such as nylon, while the temple grips 150 may be made of an elastomer such as a natural or synthetic rubber. The two materials may be bonded together by a co-molding process or may be produced separately and subsequently bonded by an adhesive. As shown in FIG. 5, each of the temple grips 150 may be disposed within a recess 134 defined in the surface 132 of the respective temple 130. In this regard, the temple grip surfaces 152 of each temple grip 150 may be surfaces defined by a plurality of spaced apart protuberances 154 protruding from a common base 156 that fits into the recess 134 and is bonded to the temple 130 therein. In this case, the temple grip surfaces 152 may be offset from the surface 132 of the respective temple 130 by a distance equal to the height of the temple grip 150 (including the protuberances 154 and the base 156) minus the depth of the recess 134. Alternatively, like the nose grips 140, the temple grips 150 may be formed integrally with the respective temples 130, in which case the temple grips 150 and corresponding temples 130 may be made of the same material and by the same molding process, for example.

Figures 6A, 6B, 6C, 6D, 6E, 6F, 6G, 6H, 6I:
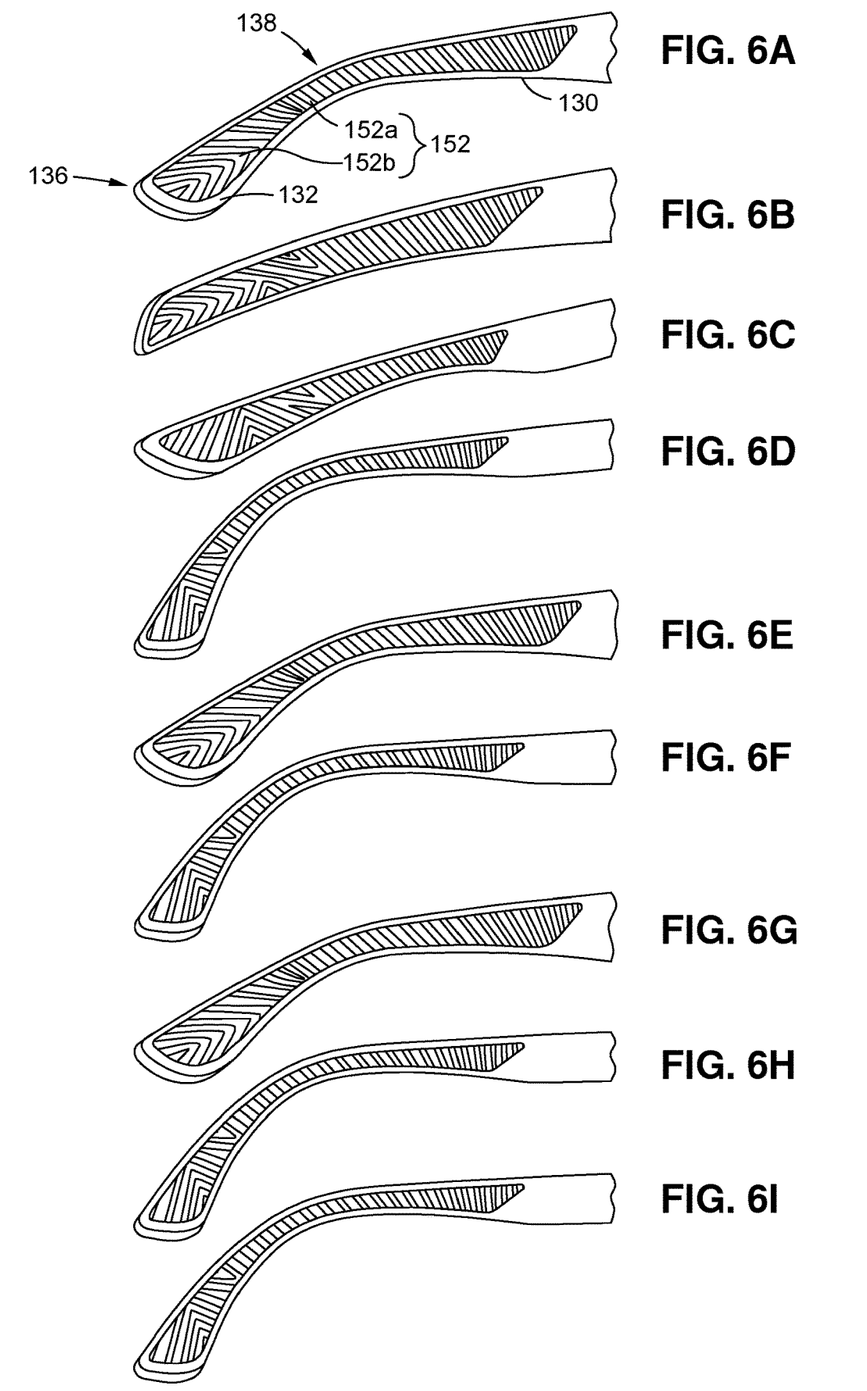
FIGS. 6A-6I are alternative side views taken along the line 6-6 in FIG. 5, with FIG. 6A showing a first example temple grip, FIG. 6B showing a second example temple grip, FIG. 6C showing a third example temple grip, FIG. 6D showing a fourth example temple grip, FIG. 6E showing a fifth example temple grip, FIG. 6F showing a sixth example temple grip, FIG. 6G showing a seventh example temple grip, FIG. 6H showing an eight example temple grip, and FIG. 6I showing a ninth example temple grip.

Like the nose grip surfaces 142, the temple grip surfaces 152 may be arranged in a pattern that promotes grip. For example, some or all of the temple grip surfaces 152 of each temple grip 150 may be arranged in stripes as shown. As more easily seen in FIGS. 6A-6I, the pattern of temple grip surfaces 152 may also include surfaces 152 that are V-shaped. As labeled in FIG. 6A (but also illustrated in FIGS. 6B-6I), the temple grip surfaces 152 may include both bar-shaped surfaces 152a, which may be arranged in stripes, and V-shaped surfaces 152b, which may interlock with one another. The V-shaped surfaces 152b may be arranged alternatingly with the bar-shaped surfaces 152a. For example, the pattern shown in FIG. 6A begins with a plurality of interlocking V-shaped surfaces 152b on one end of the temple 130 (nearest the temple tip 136) and then transitions to bar-shaped surfaces 152a arranged in stripes. As another example, the pattern shown in FIG. 6C has bar-shaped surfaces 152a arranged in stripes on either side of a plurality of V-shaped surfaces 152b. By incorporating V-shaped surfaces 152b, it can be ensured that any movement is against the grain of at least some of the temple grip surfaces 152, helping to hinder slippage in various directions.

As shown in the example patterns of FIGS. 6A-6I, the temple grip 150 may extend along a length of the respective temple 130 beginning at the temple tip 136, with the plurality of temple grip surfaces 152 comprising twenty or more, preferably thirty or more temple grip surfaces 152. The temple grip 150 may extend more than halfway along the length of the respective temple 130 (see FIG. 1). In order to maximize the amount of grip in the relatively narrow confines of the temples 130, each temple grip 150 may have a periphery that matches a contour of the surface 132 of the respective temple 130 (with a small margin as shown, for example). In this regard, although the surface 132 of each temple 130 may have a varying width along the length of the temple 130, widening at the temple tip 136 relative to a narrower bend 138 that fits over the wearer's ear, for example, the periphery of the corresponding temple grip 150 may match the varying contour of the surface 132 of the temple 130 at the temple tip 136, at the bend 138, etc., thereby maximizing the coverage of the temple grip 150. This may be advantageous as the precise position that the temples 130 contact the wearer's head may depend on each individual's anatomy and may be unknowable at the time of manufacturing the eyewear 100. By providing a temple grip 150 that covers a large portion of the temple 130, it can be ensured that at least some of the temple grip 150 contacts the wearer's head to prevent slippage.

The disclosed eyewear 100, including nose grips 140 and/or temple grips 150 as described by way of example herein, may be any kind of eyewear, especially eyewear that is used during athletic activity where the eyewear 100 is likely to move. Examples of the eyewear 100 may include sunglasses, prescription glasses, protective glasses, and smart glasses (e.g. for augmented reality gaming), among others.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. Eyewear comprising:
    a frame;
    a pair of nose pads, each of the nose pads having a surface that faces a respective side of the wearer's nose;
    a pair of nose grips disposed respectively on the pair of nose pads, each of the nose grips defining a plurality of nose grip surfaces that face the respective side of the wearer's nose and are offset toward the wearer's nose from the surface of the respective nose pad;
    a pair of temples, each of the temples having a surface that faces a respective side of the wearer's head; and
    a pair of temple grips disposed respectively on the pair of temples, each of the temple grips defining a plurality of temple grip surfaces that face the respective side of the wearer's head and are offset toward the wearer's head from the surface of the respective temple,
    wherein each of the nose grips comprises a plurality of protuberances that define the plurality of nose grip surfaces and a common base from which the plurality of protuberances protrude, the common base being disposed within a recess defined in the surface of the respective nose pad.

2. The eyewear of claim 1, wherein each of the nose grips is made of a more flexible material than the respective nose pad.

3. The eyewear of claim 1, wherein at least some of the plurality of nose grip surfaces of each of the nose grips are arranged in stripes.

4. The eyewear of claim 3, wherein the stripes extend orthogonal to a direction of gravity when the eyewear is worn.

5. The eyewear of claim 1, wherein each of the temple grips is disposed within a recess defined in the surface of the respective temple.

6. The eyewear of claim 1, wherein each of the temple grips is formed integrally with the respective temple.

7. The eyewear of claim 1, wherein each of the temple grips is made of a more flexible material than the respective temple.

8. The eyewear of claim 1, wherein at least some of the plurality of temple grip surfaces of each of the temple grips are arranged in stripes.

9. The eyewear of claim 8, wherein at least some of the plurality of temple grip surfaces of each of the temple grips are V-shaped.

10. The eyewear of claim 1, wherein the plurality of temple grip surfaces of each of the temple grips comprises twenty or more temple grip surfaces.

11. The eyewear of claim 10, wherein the plurality of temple grip surfaces of each of the temple grips comprises thirty or more temple grip surfaces.

12. The eyewear of claim 1, wherein each of the temples has a temple tip, and each of the temple grips extends along a length of the respective temple beginning at the temple tip.

13. The eyewear of claim 12, wherein each of the temple grips extends more than halfway along the length of the respective temple.

14. The eyewear of claim 1, wherein each of the temple grips has a periphery that matches a contour of the surface of the respective temple.

15. The eyewear of claim 14, wherein each of the temples has a temple tip that is wider than a portion of the temple closer to the frame, and the periphery of each of the temple grips matches the contour of the surface of the respective temple at the temple tip.

16. The eyewear of claim 1, wherein the eyewear is sunglasses.

17. Eyewear comprising:
    a frame;
    a pair of temples, each of the temples having a surface that faces a respective side of the wearer's head; and
    a pair of temple grips disposed respectively on the pair of temples, each of the temple grips defining a plurality of temple grip surfaces that face the respective side of the wearer's head and are offset toward the wearer's head from the surface of the respective temple,
    wherein at least some of the plurality of temple grip surfaces of each of the temple grips are V-shaped in a plane parallel to the surface of the respective temple.

18. Eyewear comprising:
    a frame;
    a pair of nose pads, each of the nose pads having a surface that faces a respective side of the wearer's nose; and
    a pair of nose grips disposed respectively on the pair of nose pads, each of the nose grips defining a plurality of nose grip surfaces that face the respective side of the wearer's nose and are offset toward the wearer's nose from the surface of the respective nose pad, wherein each of the nose grips comprises a plurality of protuberances that define the plurality of nose grip surfaces and a common base from which the plurality of protuberances protrude, the common base being disposed within a recess defined in the surface of the respective nose pad.

19. Eyewear comprising:

a frame;

a pair of temples, each of the temples having a surface that faces a respective side of the wearer's head; and a pair of temple grips disposed respectively on the pair of temples, each of the temple grips defining a plurality of temple grip surfaces that face the respective side of the wearer's head and are offset toward the wearer's head from the surface of the respective temple, wherein each of the temple grips comprises a plurality of protuberances that define the plurality of temple grip surfaces and a common base from which the plurality of protuberances protrude, the common base being disposed within a recess defined in the surface of the respective temple.

\* \* \* \* \*